(12) United States Patent
Ogawa

(10) Patent No.: US 8,327,392 B2
(45) Date of Patent: Dec. 4, 2012

(54) DISC TRANSFER GUIDE APPARATUS AND DISC TRANSFER MECHANISM HAVING IMPROVED THERMAL PROPERTIES

(75) Inventor: Motoharu Ogawa, Maebashi (JP)

(73) Assignee: JVC Kenwood Corporation, Yokohama-shi (JP)

( * ) Notice: Subject to any disclaimer, the term of this patent is extended or adjusted under 35 U.S.C. 154(b) by 0 days.

(21) Appl. No.: 13/169,361

(22) Filed: Jun. 27, 2011

(65) Prior Publication Data

US 2012/0005697 A1    Jan. 5, 2012

(30) Foreign Application Priority Data

Jul. 5, 2010    (JP) .................................. 2010-152598

(51) Int. Cl.
*G11B 17/04*    (2006.01)
(52) U.S. Cl. ...................................... 720/621
(58) Field of Classification Search .................. 720/604, 720/619–624, 651, 652
See application file for complete search history.

(56) References Cited

U.S. PATENT DOCUMENTS

2003/0043721 A1*    3/2003   Akatani et al. ............... 369/77.1
2008/0005759 A1*    1/2008   Omori et al. .................. 720/720

FOREIGN PATENT DOCUMENTS

JP           4312147 B       6/2006

* cited by examiner

*Primary Examiner* — Joseph Feild
*Assistant Examiner* — Gustavo Polo
(74) *Attorney, Agent, or Firm* — Marvin A. Motsenbocker; Mots Law, PLLC

(57) ABSTRACT

A disc transfer guide apparatus includes a guide plate for transferring a disc by clamping the disc in cooperation with a feed roller and a mount base to which the guide plate is mounted. The guide plate has a pair of plate portions coupled by a coupling portion that can be expandable and shrinkable in an axial direction of the feed roller. Each plate portion has a protruding piece at the outer end and the mount base has a slit engaged with the protruding piece for restraining the guide plate from moving in the axial direction of the feed roller. Each plate portion has inclined protruding threads having a protruding amount from the obverse face gradually increasing from the inner end toward the outer end.

6 Claims, 15 Drawing Sheets

--Prior Art--

--Prior Art--

--Prior Art--

DISC TRANSFER GUIDE APPARATUS AND DISC TRANSFER MECHANISM HAVING IMPROVED THERMAL PROPERTIES

CROSS REFERENCE TO RELATED APPLICATIONS

This application claims priority based on 35 USC 119 from prior Japanese Patent Application No. P2010-152598 filed on Jul. 5, 2010, entitled "DISC TRANSFER GUIDE APPARATUS AND DISC TRANSFER MECHANISM", the entire contents of which are incorporated herein by reference.

BACKGROUND OF THE INVENTION

1. Field of the Invention

The invention relates to disc transfer method applied to a disc drive apparatus for reproducing, for example, music information and map information recorded on a disc, disc-shaped information recording medium, and recording desired information on a disc. More particularly, the invention relates to a disc transfer guide apparatus that enables a disc to move linearly along a predetermined path irrespective of variations of the atmospheric temperature, and a disc transfer apparatus equipped with the guide mechanism.

2. Description of Related Art

Conventionally, a type of a disc transfer apparatus for loading a disc in a case and ejecting a disc out of the case has been known, in which a disc is transferred by clamping the disc between a slim feed roller and a guide plate made of a synthetic resin (for example, Patent Document 1: Japanese Patent No. 4312147).

In the guide plate, an inclined protruding thread that makes a disc slide in contact only with the edge of a disc is formed. In paragraphs [0028] to [0029] and FIGS. 1 and 4 of Patent Document 1, the guide plate (upper guide 13) is constructed as a strip-shaped single plate extending along the axial direction of the feed roller (rubber roller 10), and both longitudinal sides thereof are fitted and fixed to a mount base (clamp lever 14).

However, if both longitudinal sides of the guide plate formed of a single plate member are fixed to a particular mount base, the guide plate may deform due to thermal expansion under an environment in which the temperature is different from a room temperature (i.e. about 20° C.), for example under a high temperature in summer season. In this situation, the guide plate cannot transfer the disc because of thermal expansion. More specifically, in the situation which both longitudinal sides of the guide plate are fixed on a particular mount base, although the guide plate has the thermal expansion, the guide plate cannot extend. Therefore, the guide plate may be required of the replacement.

Then, a disc transfer guide mechanism shown in FIG. 1 which a protruding piece Ga formed at one longitudinal end of a guide plate G and fitted to a hole Ba formed in a mount base B, and the other end of the guide plate G is allowed to expand from the place, which the guide plate G is fixed due to thermal expansion is known.

However, in this type of guide mechanism, a disc transfer may not be carried appropriately because each inclination of the protruding threads Gb and Gb is changed separately on the one end of the guide plate G and the other end when the guide plate G expands due to thermal expansion.

More specifically as shown in FIG. 2, one side of a disc D (the left side in FIG. 14) may not be clamped by a feed roller R and the protruding thread Gb, or the clamping force may become non-uniform between the left and right sides so the disc D may wobble left and right in transferred.

As a general example, a member Gc is set on the guide plate G for centering the disc D on the central line, which the line expanding from the center of the disc D is orthogonal to the axis direction of the turntable. However, when the guide plate G expands due to thermal expansion as described above, the gap between the left side and the right side of the centering members Gc and Gc accordingly widens as shown in FIG. 2. Consequently, the centering function for the disc D is lost, and the center of the disc D cannot be positioned on the axis direction of the turntable. Even if the centering member Gc is provided separately from the guide plate G to prevent the problem, the following problem arises. When the guide plate G itself expands due to thermal expansion, the inclination of the protruding threads Gb and Gb change between the left and right sides. Moreover, the disc D starts to wobble left and right soon after the center of the disc D passes the position where there are the centering members Gc, Gc in ejected, as indicated by the dash-dotted lines in FIG. 3. Thus, the quality and grade of the apparatus must be lost.

There is another problem in used under a low temperature, for example in winter seasons or in a cold region. Although the guide plate tends to undergo thermal shrinkage, the shrinkage is restrained. Thereof the internal stress occurs.

Therefore, by the repeated used under a low temperature (i.e. in a winter season) and under a high temperature (i.e. in a summer season) in many years, the internal stress occurs repeatedly and thermal fatigue is occurred. And the possibility of the adverse effects, such as causing cracks in the guide plate by the resulting thermal fatigue, cannot be ruled out.

In addition, since synthetic resin generally become brittle (i.e., embrittle) under a low temperature, there is a possibility of damages that are cracks caused by the internal stress originating from very small deformation under room temperature which no trouble may arise.

That is, due to the temperature variation of using environment compared with normal room temperature, the guide plate is placed under a load that can lead the guide plate to deformation or damages.

SUMMARY OF THE INVENTION

The invention has been accomplished in view of the foregoing circumstances. And an object of the invention allow the disc to be transferred linearly along a predetermined path without wobbling even when the guide plate undergoes thermal expansion under a high temperature.

Moreover, another object of the invention is to alleviate the load of the guide plate that is associated with the temperature variation in using environment and to reduce the happening of deformations and damages occurring easily.

In order to accomplish the foregoing objects, embodiments provide:

(1) a disc transfer guide apparatus including:

a guide plate clamping the disc and cooperating with a feed roller that is rotation-driven in obverse and reverse directions for transferring a disc; and a mount base to which the guide plate is fitted, wherein:

the mount base has a first restraining portion for restraining movement of the guide plate with respect to an axial direction of the feed roller;

the guide plate has a pair of plate portions aligned along the axial direction of the feed roller, and a coupling portion coupling the pair of plate portions and being expandable and shrinkable in an aligning direction of the pair of plate portions;

each of the pair of plate portions has a first restrained portion engaged with the first restraining portion at only an outer end that is opposite to an inner end where the coupling portion is coupled; and each of the pair of plate portions has protruding threads each having a height whose protruding amount from the inner end toward the outer end gradually increases from an observe face of each plate portion for sliding with a contact to the edge of a disc.

(2) In embodiments, the disc transfer guide apparatus may have a centering side guide which the edge of the disc is slid with contact being at the outer end of each of the pair of plate portions.

(3) In addition, the first restraining portion may be a hole provided on the mount base, and the first restrained portion may be a protuberance provided at the outer end of each of the pair of plate portions.

(4) The mount base may have a second restraining portion for restraining the guide plate from moving along a mounting surface of the guide plate in a direction that is perpendicular to the axis of the feed roller, and a third restraining portion for restraining the guide plate from moving away from the mounting surface; and each of the pair of plate portions constituting the guide plate has a second restrained portion engaged with the second restraining portion and a third restrained portion engaged with the third restraining portion.

(5) The pair of plate portions and the coupling portion may be integrally formed from synthetic resin.

(6) The coupling portion may include a line-shaped elastic bent piece having a curved portion curved so as to protrude in a direction of transferring of the disc by the feed roller.

(7) Embodiments also provide a disc transfer mechanism comprising; a mount base; and a guide plate fitted to the mount base for transferring a disc with clamping the disc in cooperation with a feed roller that rotates in obverse and reverse directions; wherein the mount base has a first restraining portion for restraining movement of the guide plate with respect to an axial direction of the feed roller: wherein the guide plate has a pair of plate portions aligned along the direction that is parallel to the axial direction of the feed roller and a coupling portion coupling the pair of plate portions with expandable and shrinkable in the direction that is parallel to the direction in which the pair of plate portions aligns when the guide plate is thermally expanded.

According to embodiments, the guide plate has a structure which the pair of plate portions is coupled via the coupling portion being expandable and shrinkable in the axial directions of the feed roller, so by the engagement of the first restraining portion on the mount base and the first restrained portion at the outer end of each of the pair of plate portions, the feed roller is restrained from moving with respect to the axial direction. As a result, under a high temperature the pair of plate portions expands uniformly toward the inner ends with the coupling portion shrunken and the outer ends serving as the fixed ends. Otherwise, under a low temperature, the pair of plate portions shrinks uniformly toward the outer ends with the outer ends being the fixed ends and the coupling portion expands too.

For this reason, the plate portions do not deform in a plate thickness direction under a high temperature. Moreover, the inclination state of the protruding threads formed in both of the plate portions does not change relative to each other even when the pair of plate portions expands due to thermal expansion under a high temperature or shrinks under a low temperature. Thus, the disc can be transferred linearly without wobbled left and right while both ends of the disc clamped uniformly by the feed roller and the protruding threads. In particular, the quality and precision of the apparatus can be kept be high because the disc can be ejected without wobbling.

Moreover, the load applied to the guide plate in association with the temperature variation in used is alleviated. So the guide plate is not easily deformed or damaged.

Furthermore, since the guide plate having the structure in which a pair of plates is coupled by a coupling portion is an individual component, the man-hour required for fitting the guide plate does not increase and the production efficiency of the apparatus does not decrease.

In addition, since the centering side guide for sliding with a contact with the peripheral of the disc is at the outer end of each of the pair of plate portions. Moreover, even when the plate portion expands toward the inner end side due to thermal expansion or shrinks toward the outer end side, the gap between the side guides does not widen. As a result, the disc can be linearly transferred without a disc centering member that is provided separately from the guide plate in a case provided additionally. And even after the diameter of the disc passes between the side guides, the left and right peripheral of the disc are kept clamped uniformly between the feed roller and the protruding threads. Thereof the disc can be linearly transferred without wobbled left and right.

The structure in which the second restraining portion and the third restraining portions are provided on the mount base and the second restrained portion and the third restrained portions are provided on each of the pair of plate portions, can prevent rattling of the guide plate even under a vibration environment.

With a guide plate in which the pair of plate portions and the coupling portion are integrally formed from a synthetic resin, the guide plate itself can be produced using one mold.

Furthermore, in embodiments in which the coupling portion has a line-shaped elastic bent piece having a curved portion curved so as to protrude in a direction of transferring of the disc, the stretching and contracting forces of the plate portions can be absorbed effectively by elastic deformation of the curved portion.

DETAILED DESCRIPTION OF EMBODIMENTS

Hereinbelow, embodiments will be described in detail with drawings. First, the internal structure of a disc drive apparatus equipped with a disc transfer apparatus according to the embodiment is shown in FIG. 4, and the overall structure thereof will be described.

Figure 4:
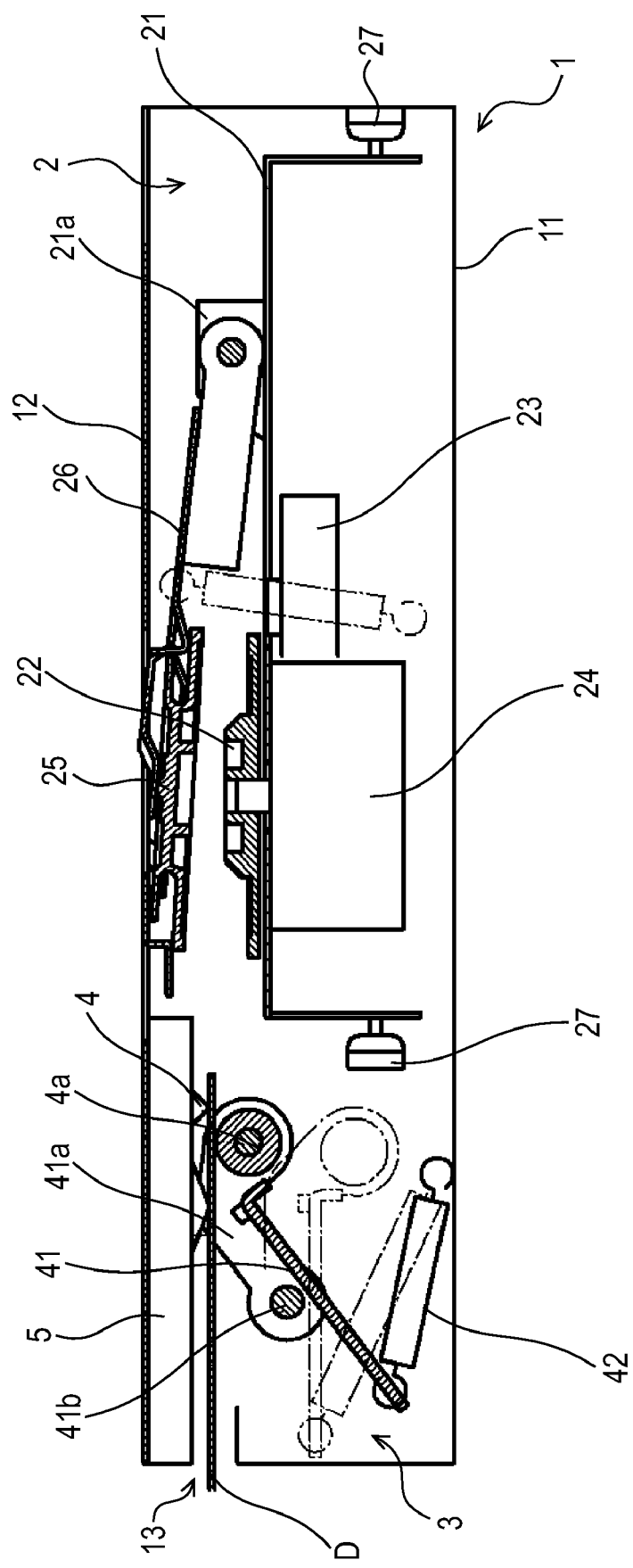
FIG. 4 shows a side view illustrating the internal structure of a disc drive apparatus equipped with a disc transfer apparatus according to the embodiment.

In FIG. 4, reference numeral 1 denotes a case that forms the exterior of the apparatus. The case 1 has a base chassis 11 formed by press-molding a metal plate, and a top plate 12 for covering the upper portion of the base chassis 11. A horizontal slot 13 for loading and ejecting a disc D is formed on the front face of the case 1.

Reference numeral 2 denotes a drive unit, which is commonly referred to as a transfer apparatus. This drive unit 2 is constructed by integrally fitting a turntable 22, an optical pickup 23, and so on to a seat plate 21 made of a metal. The turntable 22 is a circular-shaped rotation member for supporting and rotating the disc D. The turntable 22 is directly coupled to a rotor shaft of a spindle motor 24 fixed to the seat plate 21 and is rotated in one direction. The optical pickup 23 is an electronic component unit for reading recorded information of the disc D or writing information into the disc D while moving in a radial direction of the disc D supported by the turntable 22. The optical pickup 23 has, for example, a light emitting element, for example laser diode, for generating light to irradiate a disc surface, and a photoreceptor element for receiving reflected light from a disc, as is known.

Reference numeral 25 denotes a clamping disk 25 for rotatably clamping the disc in cooperation with the turntable 22. A clamping base 26 retains the clamping disk 25 rotatably. One end portion of the clamping base 26 is pivotally supported by a bracket 21a formed on the seat plate 21. Thereby, the clamping disk 25 retained by the clamping base 26 is set at a standby position as shown in FIG. 4, and the clamping disk 25 can descend from the standby position to a position for clamping the disc on the turntable 22.

The seat plate 21 constituting the drive unit 2 is elastically supported to the base chassis 11 via an anti-vibration damper 27, whereby the dropout of the reproduced sound in disc driving can be reduced.

Reference numeral 3 denotes a disc transfer apparatus for transferring a disc that is positioned between the drive unit 2 and the slot 13 formed in the case 1. The disc transfer apparatus 3 (the disc transfer mechanism 3) includes a feed roller 4 that is rotated in obverse and reverse directions and a guide plate 5 fitted to the top plate 12.

The feed roller 4 is a slim rubber roller having a shaft length substantially equal to the diameter of the disc. Both ends of a rotation shaft 4a are rotatably supported by a pair of left and right brackets 41a (only one bracket 41a is shown in FIG. 4) formed at both ends of an actuating plate 41. The actuating plate 41 has a pivot shaft 41b pivotally attached to the base chassis 11 at one end of the bracket 41a. The actuating plate 41 can swing in vertical directions with the pivot shaft 41b as a reference point. Thus, the feed roller 4 supported by the brackets 41a can be capable of ascending and descending between an evacuated position depicted by dash-dotted lines in FIG. 4 and a disc transfer position depicted by solid lines. At the disc transfer position, the feed roller 4 can transfer the disc D with clamping the disc D between the feed roller 4 and the guide plate 5.

The feed roller 4 is urged toward the disc transfer position by a spring 42 hooked between the actuating plate 41 and the base chassis 11. When guiding the disc D to the turntable 22, the feed roller 4 is pressed down toward the evacuated position by a cam member, which is not shown in drawings, against the urging force of the spring 42. At the time point when the disc D is put on the turntable 22, the feed roller 4 is at the evacuated position and is moving away from the disc. Conversely, when the disc D is transferred, the urging force of the spring 42 acts as a force for pressing the feed roller 4 against the disc D.

In this embodiment, the top plate 12 of the case 1 is used as amount base on which the guide plate 5 is fitted. The disc transfer guide apparatus includes the top plate 12 and the guide plate 5.

The structure of the guide plate 5 will be described in detail in FIG. 5 to FIG. 8. The guide plate 5 includes a pair of left and right plate portions 51 and 52 and a coupling portion 53 interposed between the left and right plate portions 51 and 52, which are integrally made by synthetic resin.

Figure 6:
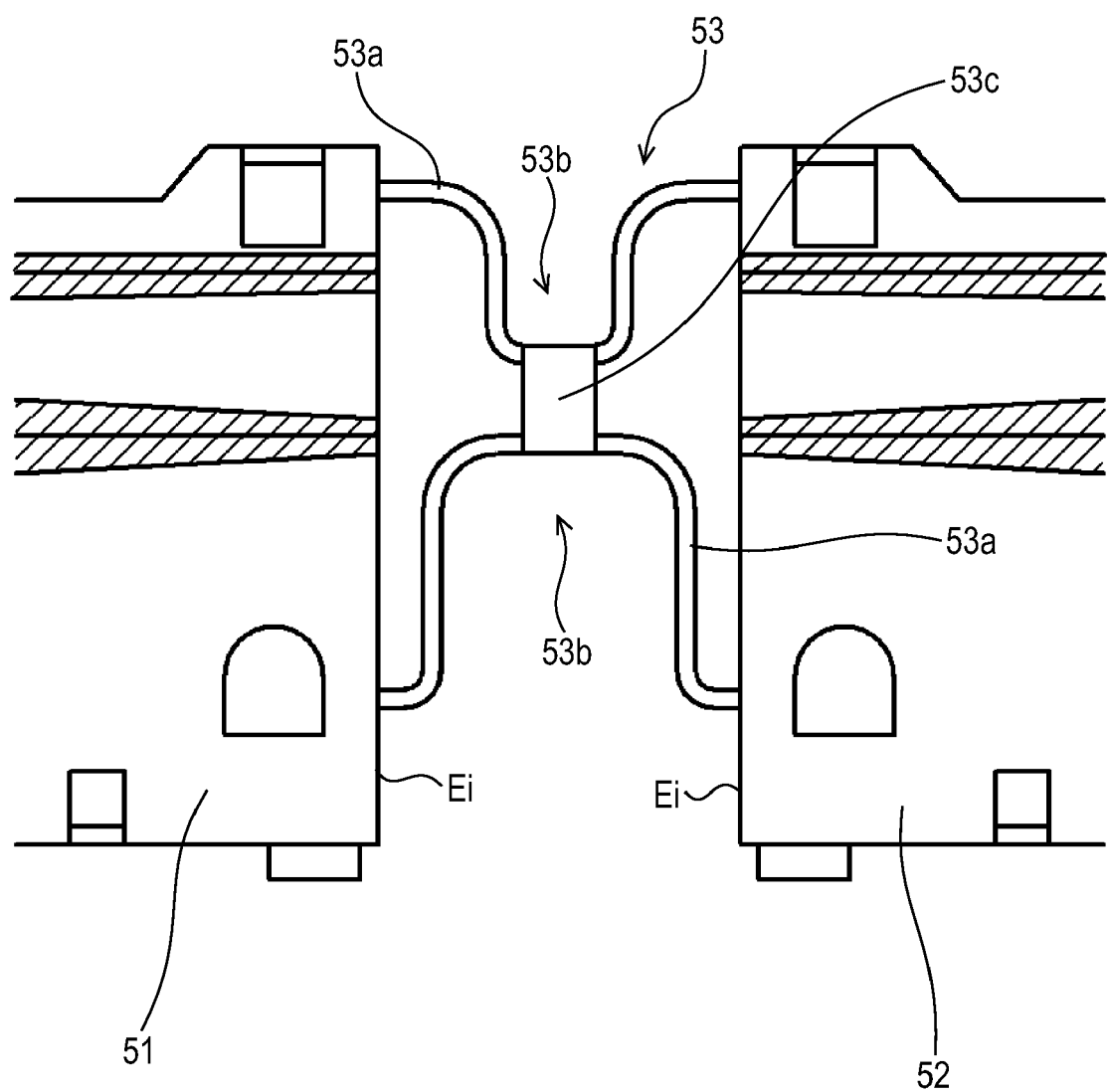
FIG. 6 shows a partially enlarged view of FIG. 5.

As obviously shown in FIG. 6, the coupling portion 53 includes two elastic bent pieces 53a coupled to the pair of plate portions 51 and 52. The elastic bent pieces 53a are in a wire-like configuration having a curved portion 53b curved so as to protrude in a direction of transferring the disc (in a vertical direction in FIG. 6) and being expandable and shrinkable in the axial direction of the feed roller 4 (the left-right direction in FIG. 6). Mid portions of the curved portions 53b and 53b of the two elastic bent pieces 53a and 53a are coupled by a thin piece 53c. And the respective ends of each the elastic bent pieces 53a and 53a are coupled to the pair of plate portions 51 and 52.

The pair of plate portions 51 and 52 are thin plates aligned along the axial direction of the feed roller 4 with the coupling portion 53 interposed therebetween. On the face f of the plate portions 51 and 52, protruding threads 51a, 51b, 52a and 52b that have triangular cross section and a ridge line t extending from the outer end Eo toward an inner end Ei in which end of each the elastic bent pieces 53a is connected are formed. Note that in FIG. 5 and FIG. 6, the hatching is used for clearly indicating the protruding threads 51a, 51b, 52a and 52b and dose not indicate cross sections.

Figure 7:
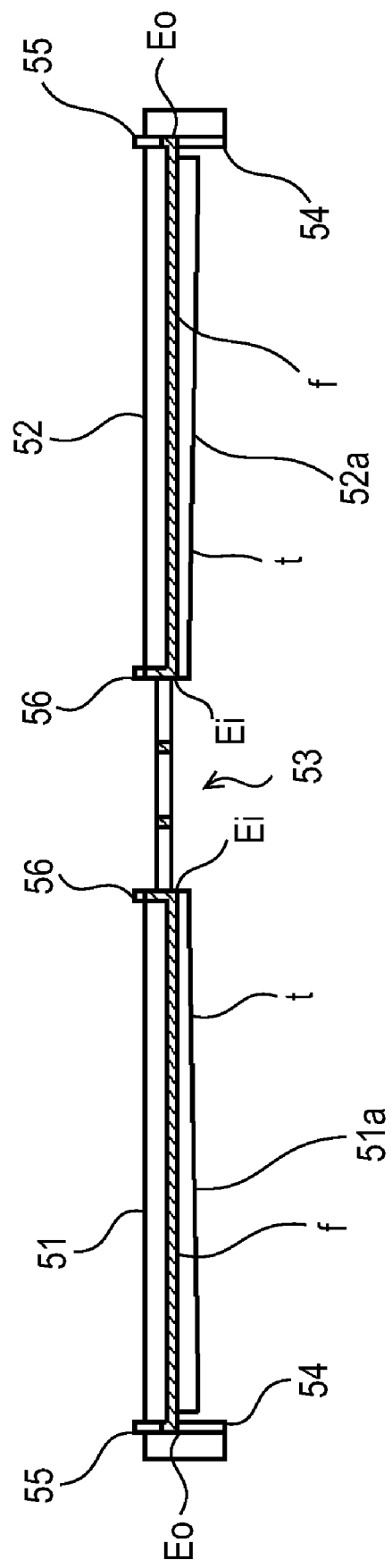
FIG. 7 shows a cross-sectional view taken along line X-X in FIG. 5.
Figure 8:
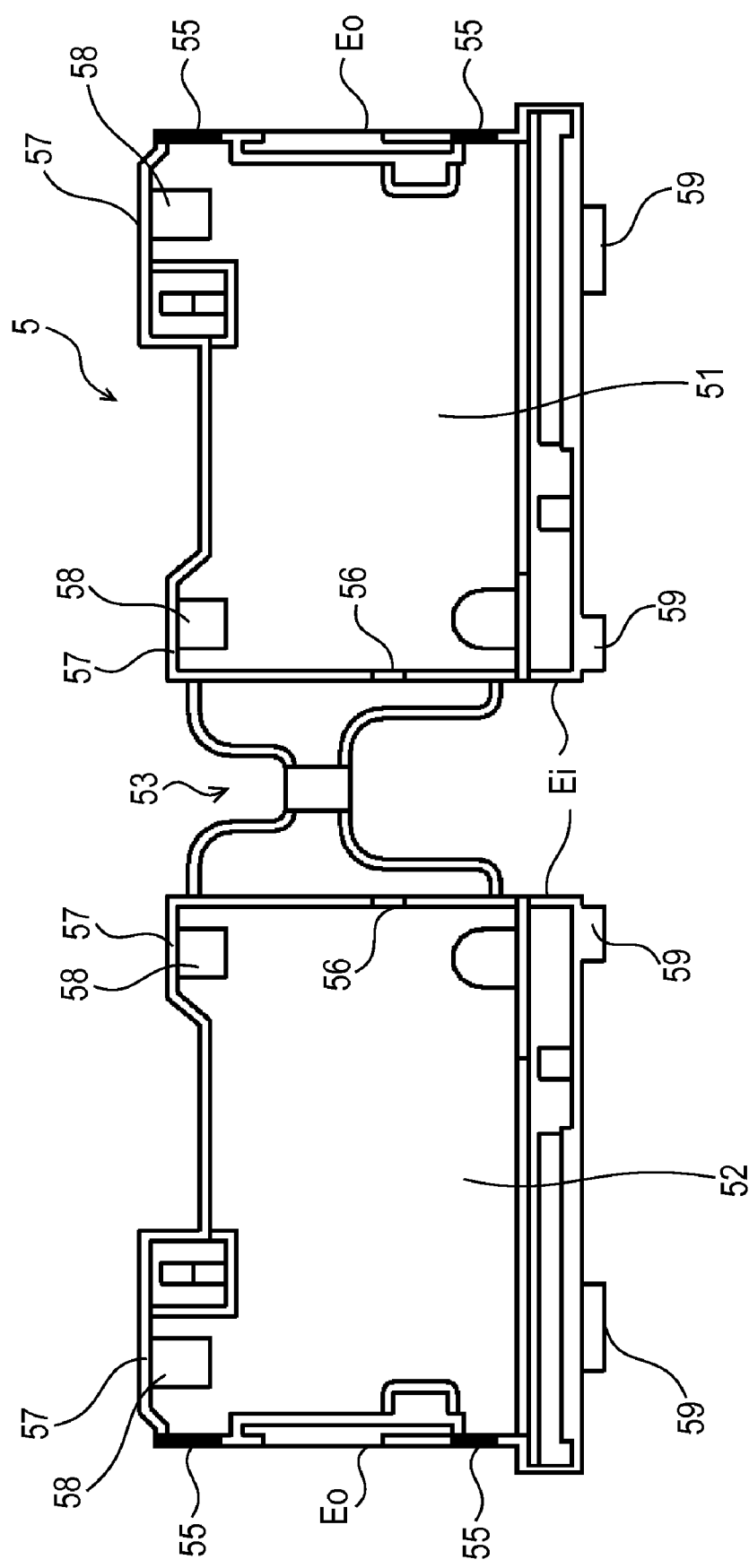
FIG. 8 shows a rear view illustrating the guide plate according to the embodiment.
Figure 9:
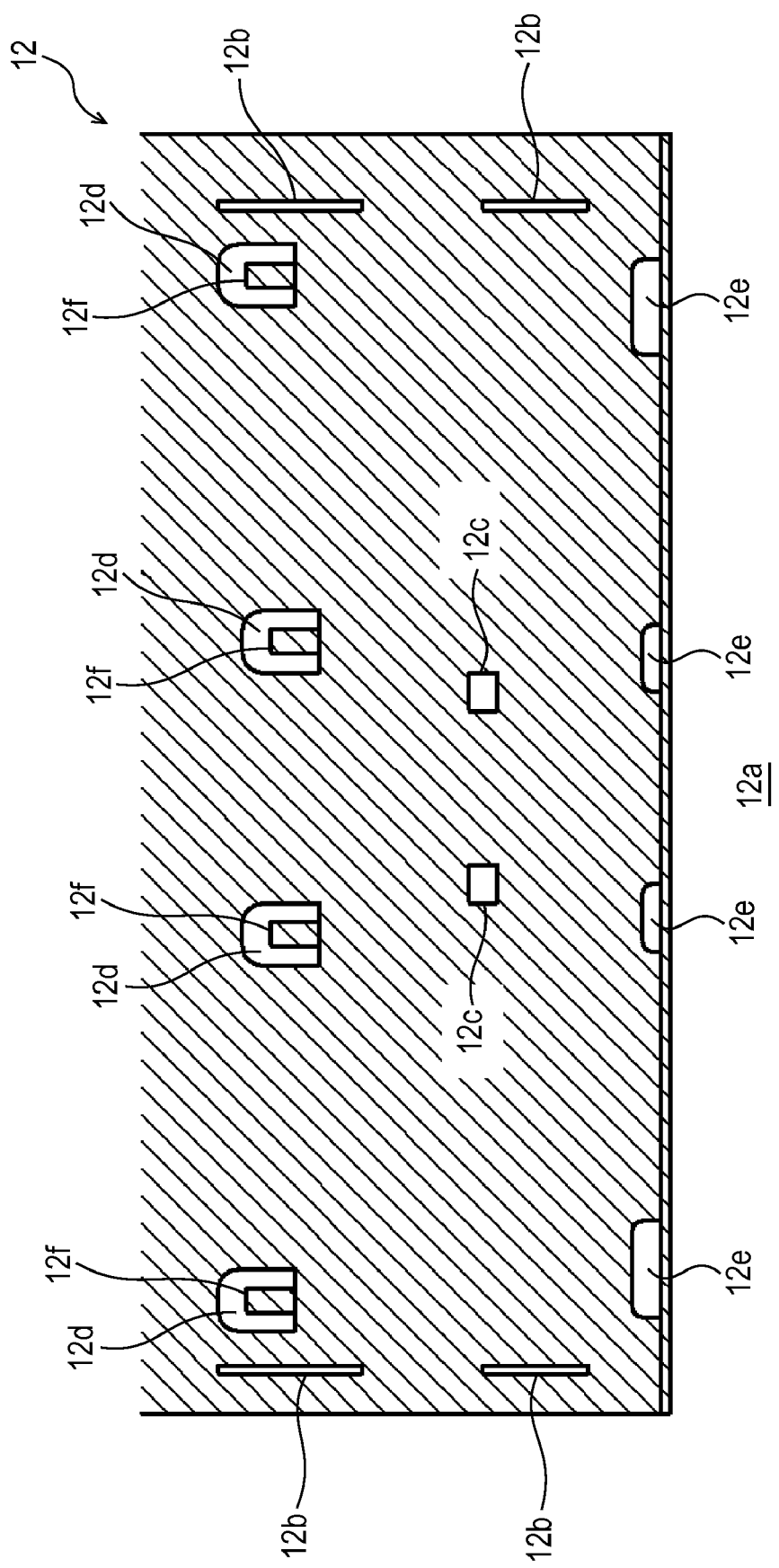
FIG. 9 shows a plan view illustrating a primary portion of a mount base to which the guide plate according to the embodiment is fitted.

As shown in FIG. 7 obviously, the protruding threads 51a, 51b, 52a and 52b (only the protruding threads 51a and 52a are shown in FIG. 7) have an inclined state with the height having a protruding amount from the obverse face f gradually increasing from the inner end Ei toward the outer end Eo. And then the height difference thereof at the two ends is approximately 1 mm. Only the edge of the transferred disc D slid with a contact with the protruding threads 51a, 51b, 52a and 52b, whereby scratches of the disc D can be prevented with the frictional resistance being alleviated during the transfer of the disc D.

In addition, the plate portions 51 and 52 have side guides 54 on the outer end Eo projecting to an orthogonal direction of plane of the face f. The left and right edge of the disc D slid with a contact with side guides 54, whereby the centering of the disc D is achieved (see FIG. 5).

Figure 5:
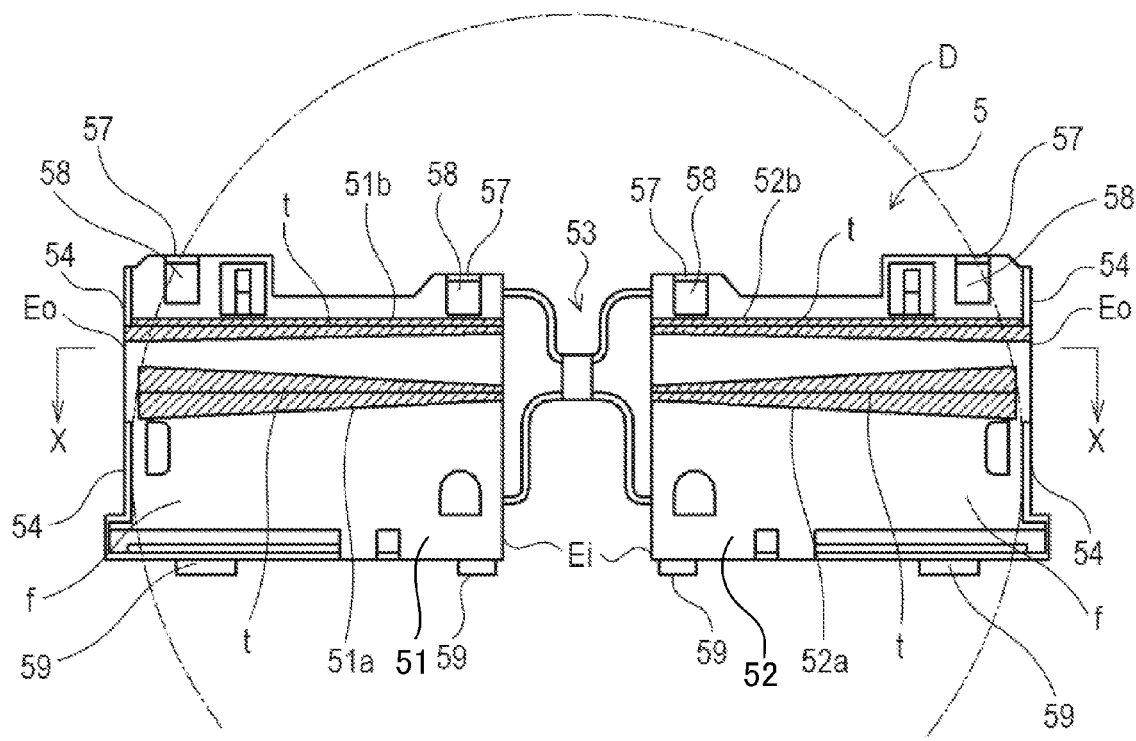
FIG. 5 shows a plan view illustrating a guide plate according to the embodiment.

As illustrated in FIG. 4 and FIG. 5, the guide plate 5 has protruding pieces 55 and 56 on the reverse plane of the face f formed protruding threads 51a, 51b, 52a and 52b, facing the top plate 12, projecting in the direction that is orthogonal direction of the face f.

As illustrated obviously in FIG. 5, two protruding pieces 55 are provided on each the plate portions 51 and 52 along the outer end Eo. The other protruding piece 56 is provided at a central portion of the inner end Ei for each the plate portions 51 and 52.

Figure 1:
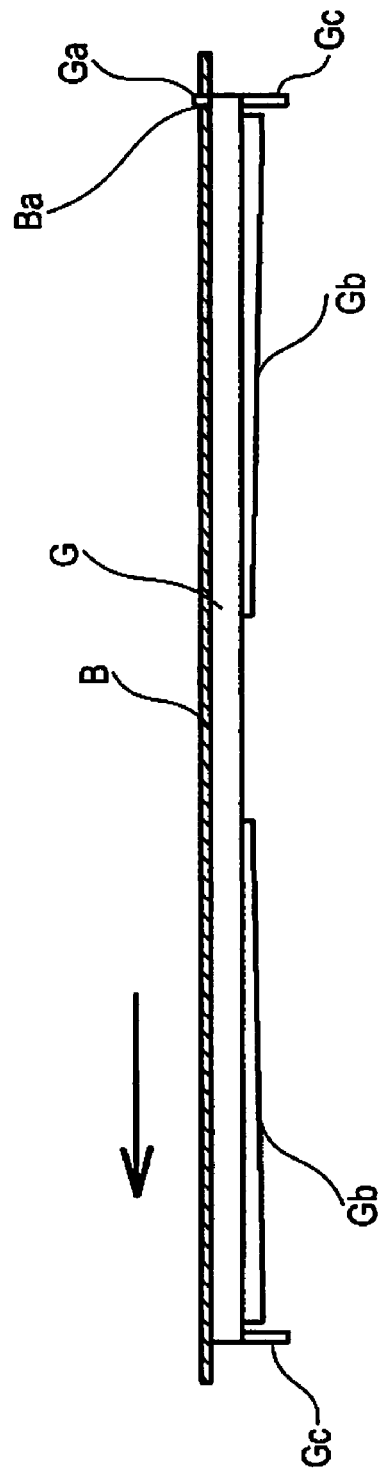
FIG. 1 shows an illustrative view illustrating an example of a mechanism of a conventional guide plate.
Figure 2:
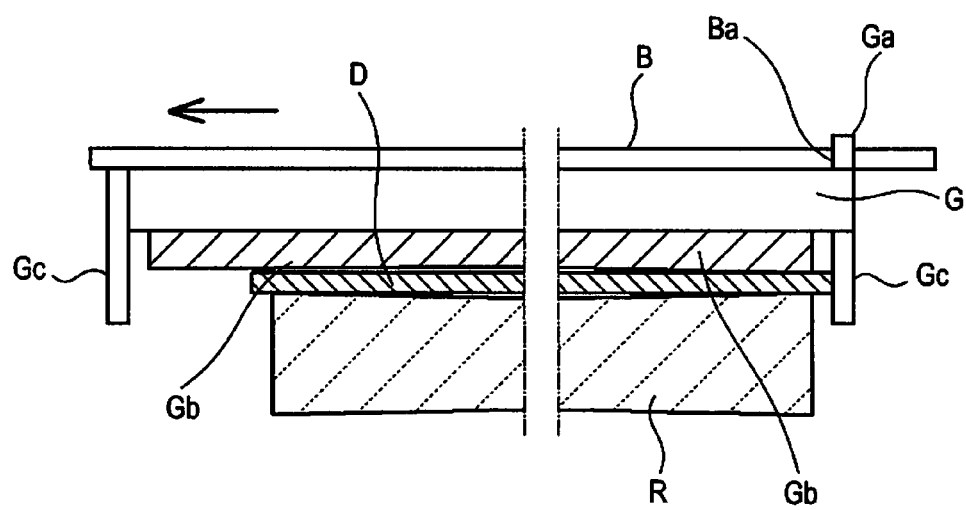
FIG. 2 shows an enlarged view illustrating both ends of the guide plate shown in FIG. 1 having expanded due to thermal expansion.
Figure 3:
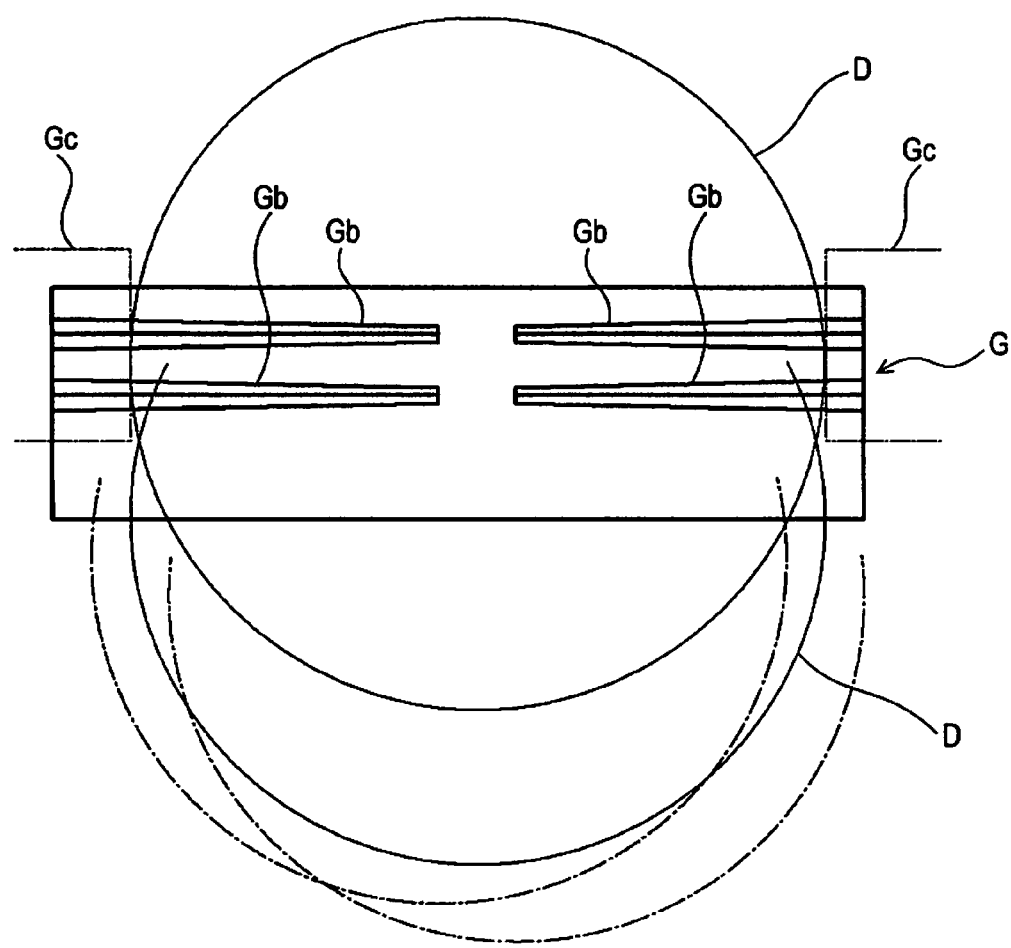
FIG. 3 shows an illustrative view illustrating how a disc is transferred by the guide plate having expanded due to thermal expansion.

As shown in FIG. 2 and FIG. 5, holes 58 are formed with line-shaped edge portions 57 left on front and rear sides of the plate portions 51 and 52 that cross the inner end Ei and the outer end Eo. Protruding pieces 59 are formed on the side that is an opposite side of holes 58 formed on the plate portions 51 and 52 and protrude from the edge into the direction that is parallel to plane of the face f.

Next, the top plate 12, which serves as the mount base fitting the guide plate 5, will be described. As illustrated in FIG. 6, the top plate 12 has a bent portion 12a formed by bending one edge of the top plate 12 and also slits 12b formed along both left and right edges orthogonal to the edge in which the bent portion 12a has been formed.

Figure 10:
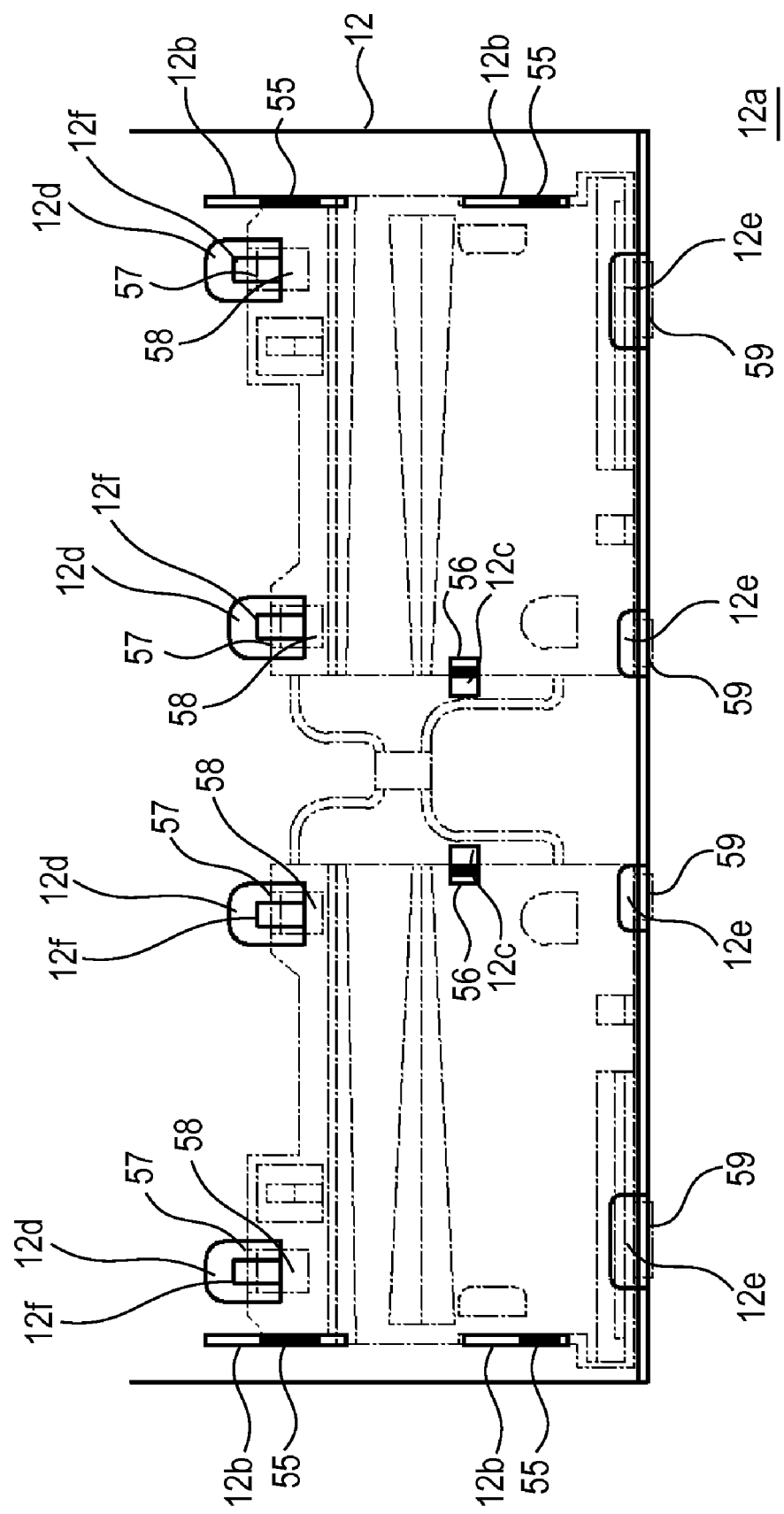
FIG. 10 shows a plan view illustrating the state in which the guide plate is fitted to the mount base shown in FIG. 9.

As illustrated in FIG. 10, the slits 12b are at the positions corresponding to the protruding pieces 55 formed at the outer ends Eo of the plate portions 51 and 52. By inserting the protruding pieces 55 into the slits 12b, the guide plate 5 is restrained from moving in the axial direction of the feed roller 4 (i.e., the left-right direction in FIG. 10). In other words, each of the slits 12b is a hole formed in the top plate 12 to serve as the first restraining portion for restraining movement of the guide plate 5 in the direction that respect to the axial direction of the feed roller 4. Each of the protruding pieces 55, which engage in the slits 12b, is a protuberance formed at the outer end Eo of each the plate portions 51 and 52 to serve as the first restrained portion.

In the top plate 12 a plurality of cut-away holes 12c, 12d, and 12e are formed so as to be scattered on left and right sides of each the slits 12b and 12b. As illustrated in FIG. 7, the cut-away holes 12c, 12c are disposed at the positions corresponding to the protruding pieces 56 formed at the inner ends Ei of the plate portions 51 and 52. By inserting the protruding pieces 56 into the cut-away holes 12c, the guide plate 5 is restrained from moving in a perpendicular direction to the axis of the feed roller 4 (i.e., a vertical direction in FIG. 7) along a mounting surface of the guide plate 5 (i.e., the inner surface of the top plate 12). In other words, each the cut-away holes 12c is formed in the top plate 12 so as to serve as the second restraining portion for restraining the guide plate 5 from moving in a perpendicular direction to the axis of the feed roller 4 along the mounting surface of the guide plate 5. Each of the protruding pieces 56, which engages with the respective cut-away holes 12c, is formed at the inner end Ei of each the plate portions 51 and 52 so as to serve as the second restrained portion. The size of the cut-away hole 12c is wider than the protruding piece 56. The cut-away hole 12c does not restrain the protruding piece 56 with respect to the axial direction of the feed roller 4 and permits displacement of the protruding piece 56 in the same direction.

Figure 11:
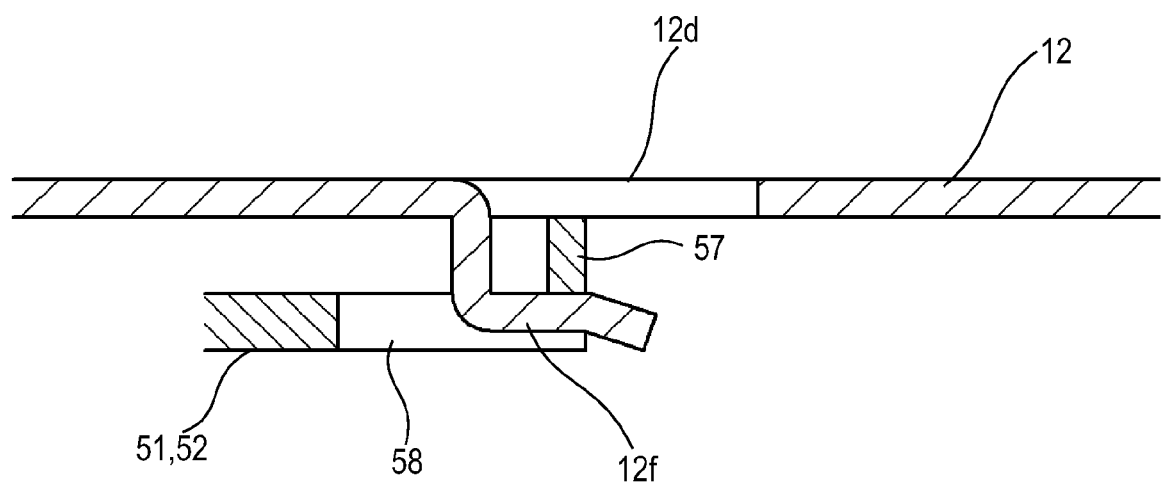
FIG. 11 shows a partially enlarged cross-sectional view illustrating a mount portion of the guide plate.
Figure 12:
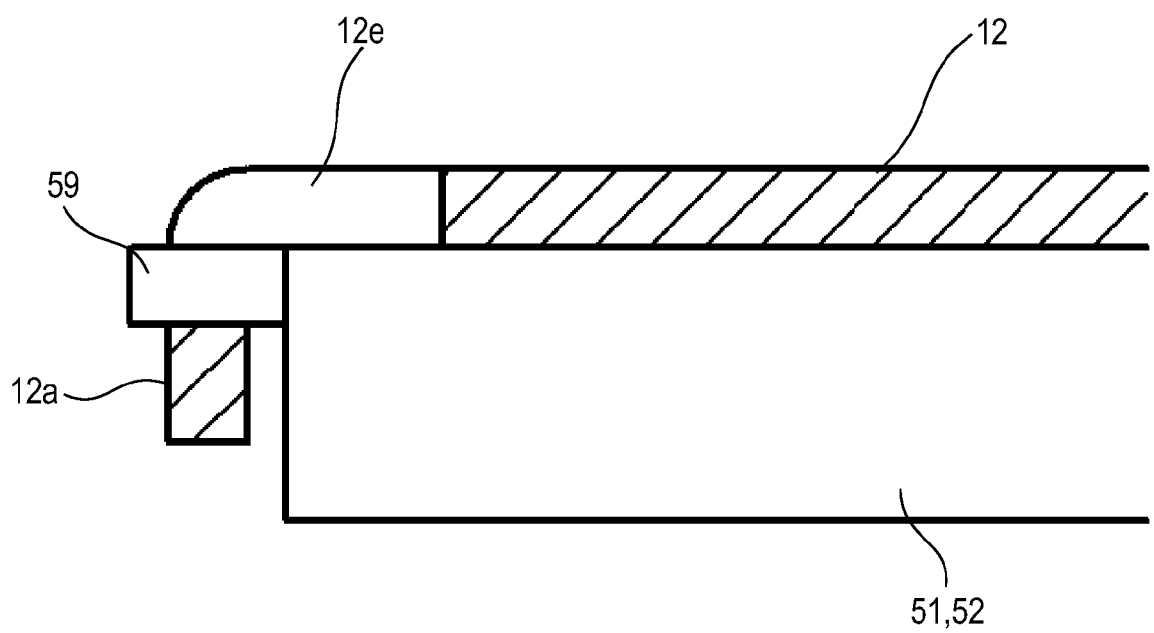
FIG. 12 shows a partially enlarged cross-sectional view illustrating a mount portion of the guide plate.

Protruding pieces 12f are formed continuously on the opening edges of the cut-away holes 12d and the cut-away holes 12e formed along the bent portion 12a penetrate the bent portion 12a in a thickness direction of the top plate 12. As clearly described in FIG. 10, the protruding pieces 12f are at the positions corresponding to the holes 58 of the plate portions 51 and 52 and the cut-away holes 12e are at the positions corresponding to the protruding pieces 59 of the plate portions 51 and 52. As illustrated in FIG. 11, the protruding piece 12f has an L-shape and the foremost end of the protruding piece 12f makes contact with the edge portion 57 of the plate portion through the hole 58 in the plate portions 51 and 52. As illustrated in FIG. 12, the protruding piece 59 of the plate portions 51 and 52 contact with the opening edge (the bent portion 12a) of the top plate 12 via the cut-away hole 12e of the top plate 12. Thus, the protruding piece 12f and the edge portion 57 as well as the cut-away hole 12e and the protruding piece 59 restrain the guide plate 5 from moving away from the mounting surface. In other words, each the protruding pieces 12f and each the cut-away holes 12e are formed in the top plate 12 to serve as the third restraining portion for restraining the guide plate 5 from moving away from the mounting surface. Moreover, each the edge portions 57 and each the protruding pieces 59, which engage respectively with the protruding pieces 12f and the cut-away holes 12e, are formed in the plate portions 51 and 52 to serve as the third restrained portion.

Figure 13:
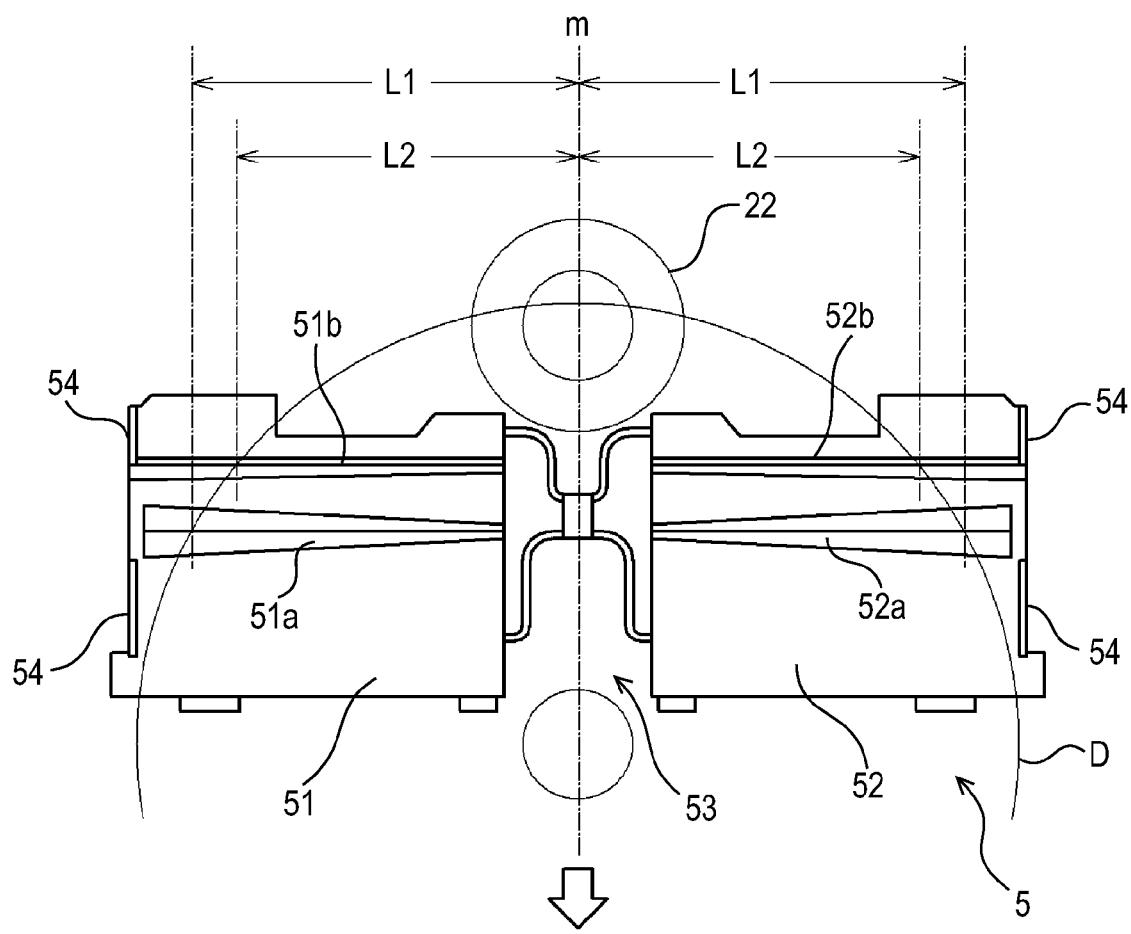
FIG. 13 shows an illustrative view illustrating the positional relationship between the guide plate according to the embodiment and a disc being transferred.

Here, the operations of the disc transfer apparatus 3 configured as explained above will be described. In FIG. 13, m represents a virtual reference line that is orthogonal to the axis line of the turntable 22 and is the mid portion of the axial direction of the feed roller. The guide plate 5 is fitted bilaterally symmetrically with the reference line m being the center. As a result, the disc D is centered by the side guides 54 and 54 formed on the pair of plate portions 51 and 52 so that the center of the disc D is positioned on the reference line m. The peripheral edge of the disc D is slid with contact the left and right of protruding threads 51a and 52a with an equidistance L1 from the reference line m and an equidistance L2 from the reference line m to the protruding threads 51b and 52b.

Figure 14:
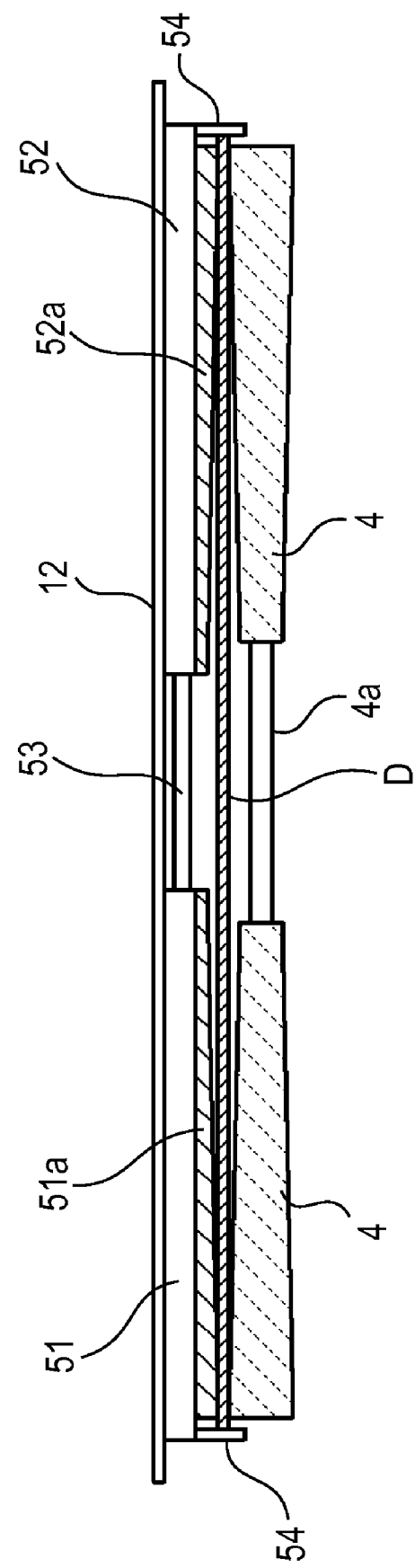
FIG. 14 shows a front view illustrating the state in which a disc is clamped by the guide plate according to the embodiment and feed rollers.

As illustrated in FIG. 14, the feed roller 4 rotates with contact the other side (the signal recording side) of the disc D between the protruding threads 51a and 51b, 52a and 52b. As clearly illustrated in FIG. 14, the feed roller 4 has a shape which the diameter gradually increases from the central portion toward both end portions, whereby both end portions of the feed roller 4 contacts with only the peripheral edge of the disc D and also on the other side of the disc D. Thus, the disc D is transferred with both left and right edges of the disc D clamped uniformly by the feed rollers 4 and the protruding threads 51a and 51b, 52a and 52b. As a result, in ejected, the disc D is ejected straight along the reference line m without wobbled left and right. Left and right edges of the disc D are being clamped uniformly even after the center of the disc D passes between the side guides 54 and 54. (Illustrated in FIG. 13)

Figure 15:
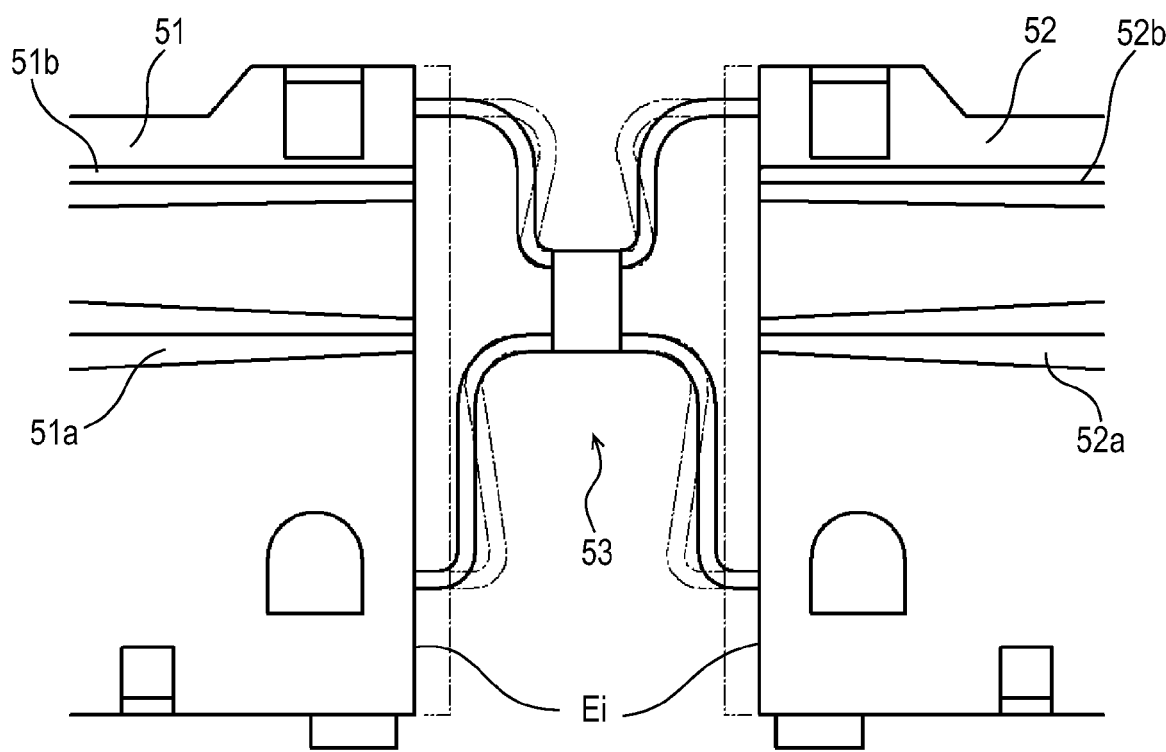
FIG. 15 shows an illustrative view illustrating the state in which a pair of plate portions expands due to thermal expansion.

The guide plate 5 has a structure which the pair of plate portions 51 and 52 is coupled via the coupling portion 53 being expandable and shrinkable in an axial direction of the feed roller 4. Because the protruding pieces 55 formed at the outer ends Eo of the pair of plate portions 51 and 52 are inserted in the slits 12b of the top plate 12 and has the engagement with the slits 12b, the outer ends Eo of the plate portions 51 and 52 can be positioned and fixed with respect to the axial direction of the feed roller 4. As a result, under a high temperature, the pair of plate portions 51 and 52 expands uniformly toward the inner ends Ei with the outer ends Eo being as the fixed ends while allowing the coupling portion 53 to contract as indicated by the dash-dotted lines in FIG. 15. Accordingly, the gap between the left and right side of guide 54 and 54 does not vary and the left and right of protruding threads 51a and 52a, 51b and 52b also expand uniformly. Therefore, no height difference is formed between the left and right of protruding threads 51a and 52a, 51b and 52b on the circumference having the reference line m shown in FIG. 10. Hence, even when the plate portions 51 and 52 expand due to thermal expansion under a high temperature, the stretching force is absorbed by the contraction of the coupling portion 53. Moreover the plate portions 51 and 52 are prevented from deforming in a plate thickness direction. In addition, the left and right of protruding threads 51a and 52a, 51b and 52b expand uniformly. Therefore, without replacing the guide plate 5, the disc D can be transferred appropriately without any trouble.

Under a low temperature, the pair of plate portions 51 and 52 shrinks uniformly toward the outer ends Eo which is as fixed ends with the coupling portion 53 expanding. As a result, the gap between each left and right side of guides 54 and 54 does not vary even under a low temperature and the left and right of protruding threads 51a and 52a, 51b and 52b also shrink uniformly. Therefore, the disc D can be transferred appropriately without any trouble. Generally, causes of problems of a polymer structure such as a synthetic resin in a low temperature are more likely to be a fragile phenomenon than a shrinkage phenomenon. However, if the structure undergoes fragile, the load applied to the pair of plate portions 51 and 52 is reduced by the expansion of the coupling portion 53. Therefore, damages resulting from being fragile do not occur easily.

Embodiments have been described hereinabove. However, the invention is not limited to the foregoing structures. It is possible that the slit 12b serving as the first restraining portion may be allowed to have the functions as the second and third restraining portions. And that the protruding piece 55 serving as the first restrained portion may also be allowed to have the functions as the second and third restrained portions.

For example, the slit 12b may have such a structure that the protruding piece 55 is press-fitted into the slit 12b. Thus, the guide plate 5 can be fitted to a mount base (for example, to the top plate 12) with restrained from moving in three orthogonal directions. Moreover, the mount base with a screw hole and a screw that can be screwed into the screw hole serves as the first restraining portion. At the same time, a hole providing on the outer end Eo of each the plate portions 51 and 52 for passing the screw. Therefore, the outer ends Eo of the plate portions 51 and 52 can be screw-fastened to the mount base. In this case, the screw hole and the screw serve all the functions as the first to third restraining portions and the hole serves all the functions of the first to third restrained portions. Thus, it is possible to eliminate the components in the example shown in drawings, such as the cut-away holes 12c, the protruding pieces 12f, the cut-away holes 12e, the protruding pieces 56, the edge portions 57, and the protruding pieces 59.

It is preferable that the first restraining portion be a hole (the slit 12b) and the first restrained portion be a protuberance (the protruding piece 55) in the above-described example because such a structure can prevent the plate portions 51 and 52 from chattering in the axial direction of the feed roller 4 even when the plate portions 51 and 52 expand due to thermal expansion (i.e., when the first restrained portion is a hole, the diameter of the hole expands due to thermal expansion). Otherwise, it is possible that the first restraining portion may be a protuberance and the first restrained portion that engages with the first restraining portion may be a hole.

Furthermore, the coupling portion 53 is not limited to be constructed by the two elastic bent pieces 53a, but the coupling portion 53 may only include one elastic bent piece 53a. It is also possible that the shape of the coupling portion 53 may be a wave-like shape in which curved portions 53b are connected.

What is claimed is:

1. A disc transfer guide apparatus comprising:
a guide plate for transferring and clamping a disc in cooperation with a feed roller that rotates in obverse and reverse directions; and
a mount base to which the guide plate is fitted, wherein:
the mount base has a first restraining portion for restraining movement of the guide plate with respect to an axial direction of the feed roller;
the guide plate has a pair of plate portions aligned along the direction that is parallel to the axial direction of the feed roller, and a coupling portion coupling the pair of plate portions and which expands and shrinks in the direction that is parallel to the direction in which the pair of plate portions aligns;
each of the pair of plate portions has a first restrained portion engaged with the first restraining portion and provided at only an outer end that is opposite to an inner end to which the coupling portion is coupled; and
each the pair of plate portions has a protruding thread, which has a height of a protruding amount from an observe face to the plate portion gradually increases from the inner end toward the outer end for contacting with a peripheral of the disc;
wherein the coupling portion has a line-shaped elastic bent piece having a curved portion bent so as to protrude in the direction of transferring of the disc by the feed roller.

2. The disc transfer guide apparatus according to claim 1, wherein a centering guide that contacts a peripheral edge face of the disc is provided at the outer end of each the pair of plate portions.

3. The disc transfer guide apparatus according to claim 1, wherein the first restraining portion is a hole provided on the mount base and the first restrained portion is a protuberance provided at an outer end of each the pair of plate portions.

4. The disc transfer guide apparatus according to claim 1, wherein:
the mount base has a second restraining portion for restraining the guide plate from moving along a mounting surface of the guide plate in a direction that is perpendicular to the axis direction of the feed roller and a third restraining portion for restraining the guide plate from moving away from the mounting surface; and
each the pair of plate portions constituting the guide plate has a second restrained portion engaged with the second restraining portion and a third restrained portion engaged with the third restraining portion.

5. The disc transfer guide apparatus according to claim 1, wherein the pair of plate portions and the coupling portion are integrally formed from a synthetic resin.

6. A disc transfer mechanism comprising:
a mount base; and
a guide plate fitted to the mount base for transferring and clamping a disc in cooperation with a feed roller that rotates in obverse and reverse directions;
wherein the mount base has a first restraining portion for restraining movement of the guide plate with respect to an axial direction of the feed roller:
wherein the guide plate has a pair of plate portions aligned along the direction that is parallel to the axial direction of the feed roller, and a coupling portion coupling the pair of plate portions and which expands and shrinks in the direction that is parallel to the direction in which the pair of plate portions aligns when the guide plate is thermally expanded, wherein the coupling portion has a line-shaped elastic bent piece having a curved portion bent so as to protrude in the direction of transferring of the disc by the feed roller.

* * * * *